UNITED STATES PATENT OFFICE.

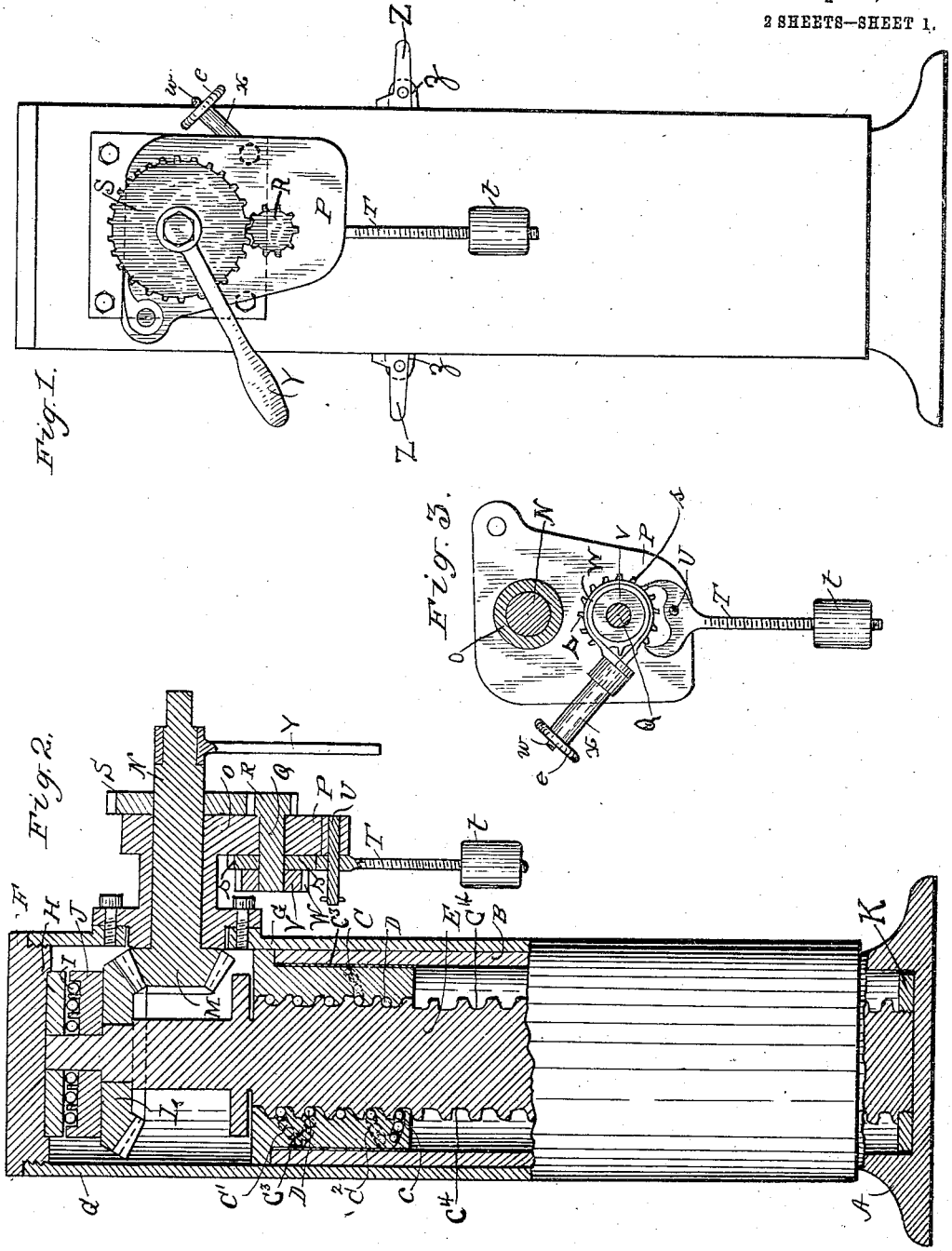

CALVIN T. STARBUCK, OF BIRMINGHAM, ALABAMA.

SCREW-JACK.

969,215.

Specification of Letters Patent. Patented Sept. 6, 1910.

Application filed May 25, 1909. Serial No. 498,184.

*To all whom it may concern:*

Be it known that I, CALVIN T. STARBUCK, a citizen of the United States of America, residing at Birmingham, in the county of Jefferson and State of Alabama, have invented certain new and useful Improvements in Screw-Jacks, of which the following is a specification.

This invention relates to hoisting and particularly to a screw jack having anti-friction balls engaging the threads of the movable member.

An object of the invention is to provide novel means for intermittently arresting the jack to guard against too rapid descent of the standard, means being also provided on the said manually operated device for braking the jack in its descent. This last provision guards against the too sudden descent of the jack when weighted.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 4:
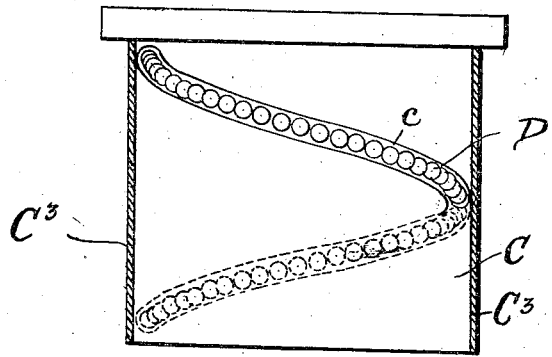
Figure 5:
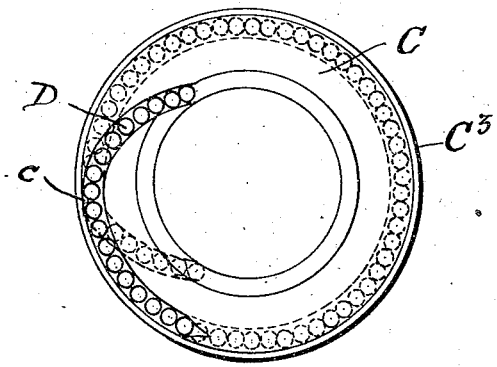
Figure 6:
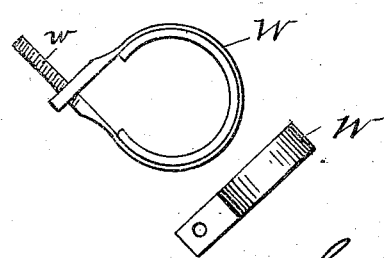

Figure 1, is a vertical sectional view of a jack embodying the invention; Fig. 2, illustrates a side elevation of the nut member of the jack with the ball race indicated in dotted lines; Fig. 3, is a detail view of the escapement mechanism and the brake; Fig. 4, is an enlarged detail view of the nut showing the race way and the balls therein; Fig. 5, is a top plan view thereof; and Fig. 6, is a side elevation and edge view of the brake, the operating sleeve being omitted.

In these drawings A, denotes a base; B, a casing having its upper end supporting a nut C. The nut C, has the ball race $c$, therein which extends spirally of the nut and has two extensions $C'$, $C^2$, communicating with the interior of the nut and adapted to convey the balls D, which travel in the ball race, into the spaces between the threads of the nut.

By reason of the fact that the ball race $c$, merges with the outer surface of the nut C, a channel is formed, which permits the application of the balls thereto. This opening in the nut is closed, however, by means of a sleeve $C^3$ secured to the nut C, and hence said sleeve is interposed between the nut C, and the standard. It follows, that when it is desired to remove or apply the balls to the ball race, the sleeve $C^3$, may be removed and access may be had to the ball race through the opening in the side of the nut C.

A screw E, is applied to the interior of the nut and has screw threads fitted to the threads of the nut C, the contacting portions of the said threads being curved as shown at $C^4$. This construction of the contacting surfaces of the threads is for the purpose of minimizing the friction and adding strength and durability to the structure. The surfaces of the threads engaged by the balls are approximately at right angles to the nut and bolt respectively, and the space between the surfaces is practically equal to the diameter of the balls which travel therein.

The head F, of the jack is threaded in a sleeve G, and said sleeve is slidable on the standard B. The upper end of the screw E, is reduced in diameter, and has a plate H, fitted thereto, which plate lies in a recess of the bearing head F. The plate H, is supported on balls I, which run in ball ways in the bearing block J, and by this arrangement, the screw E, and bearing block J, may rotate with relation to the plate H, the said plate being supported on the balls regardless of the direction of travel of the screw. The lower end of the screw is provided with a collar K, which is designed to contact the lower end of the nut, to limit the upward movement of the screw said collar is preferably in the form of a disk of such a size as to contact the inner sides of the casing whereby the screw is steadied and prevented from wabbling or rocking.

The upper end of the screw E, is provided with a toothed wheel L, which meshes with a pinion M, on the shaft N, which shaft N, is journaled in a bearing O, which is secured to and travels with the sleeve G, as it is elevated by the screw. The bearing O, has a depending portion P, in which a shaft Q, is journaled and said shaft has a pinion R, meshing with a gear wheel S, on the shaft N. The shaft Q, has an escapement wheel $s$, which is engaged by an escapement lever T, pivoted on a pin U, projecting from the depending portion P. The shaft Q, is also provided with a brake wheel V, embraced by a friction band W, and through the control of the friction band, the rotation of the friction wheel and the shaft is regulated.

The escapement lever T, is screw threaded and is provided with a weight t, for regulating the rapidity of movement of the said escapement lever. The friction band has a threaded shank w, engaged by a threaded nut X, having an operating handle e. The threaded shank w, is run through an aperture in the friction band and the nut bears against the said apertured end and moves the friction band in relation to the friction wheel. The shaft N, has an operating handle Y, which is detachably applied to the said shaft.

The jack is provided with handles Z, pivoted to ears z, projecting from the sides of the jack.

The friction band and escapement mechanism is preferably interposed between the depending portion P, and the sleeve G, and the nut X, is likewise so interposed except for the operating handle which extends clear of the side of the depending portion P.

It will be perfectly apparent, it is thought, that the operation of the lifting jack will be under the control of an operator, either for the purpose of raising the jack through the manipulation of the lever Y, or for the purpose of permitting the descent of the jack gradually through the control afforded by the friction and escapement mechanism.

I claim—

1. In a lifting jack, a base and casing, a sleeve slidable on the casing, a nut in the casing, a screw threaded in the nut, a bearing head in the end of the sleeve, a connection between the bearing head and screw whereby the bearing head is elevated, means for rotating the screw, and an escapement connected to the screw rotating means whereby the movement of the screw rotating means is regulated.

2. In a lifting jack, a base and casing, a sleeve slidable on the casing, a nut in the casing, a screw threaded in the nut, a bearing head in the end of the sleeve, a connection between the bearing head and screw whereby the bearing head is elevated, a shaft for rotating the screw, a rotating member geared to the shaft, and an escapement for controlling the rotating member.

3. In a lifting jack, a base and casing, a sleeve slidable on the casing, a nut in the casing, a screw threaded in the nut, a bearing head in the end of the sleeve, a connection between the bearing head and screw whereby the bearing head is elevated, a shaft for rotating the screw, a rotating member geared to the shaft, a brake, and an adjustable escapement for regulating the movement of the rotating member.

4. In a lifting jack, a base and casing, a sleeve slidable on the casing, a nut in the casing, a screw threaded in the nut, a bearing head in the end of the sleeve, a connection between the bearing head and screw whereby the bearing head is elevated, a shaft for rotating the screw, a second shaft geared to the first mentioned shaft, an escapement wheel and a friction wheel on the second shaft, a friction band on the friction wheel, means for adjusting the friction band, and an escapement operating in conjunction with the escapement wheel.

5. In a lifting jack, the combination with a base, and casing, a sleeve slidable on the casing, a nut in the casing, said nut having a channel adapted to receive balls, a screw threaded in the nut, and a bearing head in the end of the sleeve, of a connection between the bearing head and the screw whereby said head is elevated, means for rotating the screw, a rotating member geared to said means, a brake, and an escapement for regulating the movement of said rotating member.

6. In a lifting jack, a base and casing, a sleeve slidable on the casing, a nut in the casing, a screw threaded in the nut, a bearing head in the end of the sleeve, a connection between the bearing head and screw whereby the bearing head is elevated, a bearing mounted on said casing, a shaft journaled therein adapted to rotate said screw, a gear on said shaft, said bearing having a depending portion, a shaft journaled in said depending portion, a pinion on said shaft meshing with said gear, an escapement wheel on said shaft, and an escapement pivoted on said depending portion and adapted to regulate said escapement wheel.

In testimony whereof, I affix my signature in the presence of two witnesses.

CALVIN T. STARBUCK.

Witnesses:
L. J. HALEY, Jr.,
E. D. STARBUCK.